United States Patent [19]

Kano et al.

[11] Patent Number: 5,721,332
[45] Date of Patent: Feb. 24, 1998

[54] PHENOLIC RESIN

[75] Inventors: Haruyuki Kano; Yoshihisa Sone; Kouichi Yoshimura, all of Ibaraki-ken; Hiroichi Kouyama, Wakayama, all of Japan

[73] Assignee: Sumikin Chemical Co., Ltd., Tokyo, Japan

[21] Appl. No.: 586,420

[22] Filed: Jan. 16, 1996

Related U.S. Application Data

[63] Continuation of Ser. No. 242,961, May 16, 1994, abandoned.

[51] Int. Cl.$^6$ ...................................................... C08G 2/18
[52] U.S. Cl. ............................................. 528/129; 528/162
[58] Field of Search ..................................... 528/129, 139, 528/155, 162

[56] References Cited

U.S. PATENT DOCUMENTS

| | | | |
|---|---|---|---|
| 3,936,510 | 2/1976 | Harris et al. | 428/417 |
| 4,020,035 | 4/1977 | Edwards et al. | 528/129 |
| 4,318,821 | 3/1982 | Harris et al. | 528/129 |
| 4,340,700 | 7/1982 | Edwards | 528/155 |

FOREIGN PATENT DOCUMENTS

| | | |
|---|---|---|
| 4-173834 | 2/1992 | Japan . |
| 04142324 | 5/1992 | Japan . |
| 4-142328 | 9/1992 | Japan . |

*Primary Examiner*—Jeffrey Mullis
*Attorney, Agent, or Firm*—Wenderoth, Lind & Ponack

[57] ABSTRACT

A phenolic resin obtained by reacting a phenol with an aromatic aldehyde and a xylylene compound represented by the formula $$ROH_2C(C_6H_4)CH_2OR$$

where R is hydrogen, an alkyl group having a carbon atom number of 1–4, or an acyl group having a carbon atom number of 2–4 in the presence of acid catalyst, with the sum of aromatic aldehydes and xylylene compounds to phenols molar ratio being 0.1–0.95, and the xylylene compounds to aromatic aldehydes molar ratio being 0.1–1.4.

The phenolic resin thus obtained is useful as an industrial material by virtue of its excellent moisture resisting property, alkali resistance and fair thermosetting property. Having low moisture absorption ratio and high glass transition temperature, this phenolic resin is also suitable used as hardener for semiconductor encapsulating epoxy resin which has excellent package crack resistance after solder dipping and high reliability.

8 Claims, No Drawings

PHENOLIC RESIN

This application is a continuation of now abandoned application, Ser. No. 08/242,961, filed May 16, 1994.

BACKGROUND OF THE INVENTION

(1) Field of the Invention

The present invention relates to phenolic resin. The phenolic resin of the present invention is excellent in thermal resistance and has low moisture resistance and superior heat curability, being useful as a molding material, a laminating material, a binder for various applications, a coating material and a hardener for semiconductor encapsulating composition.

(2) Description of the Prior Art

Phenol-formaldehyde resin finds its usage as an inexpensive heat resistant resin suitable for a wide variety of applications. Although the phenol-formaldehyde resin exhibits its initial thermal resistance up to a heat level of 200° C. or above where it is allowed to undergo sufficient after-cure, its long-term thermal resistance is said to be 150° C. or below due to its susceptibility to degradation caused by the phenolic hydroxyl group. Moreover, the range of application of the phenol-formaldehyde resin is limited to a significant extent due to its relatively inferior moisture resisting property and alkali resistance, which disadvantages being attributed to the presence of such phenolic hydroxyl group.

It was for the purpose of making up for the said shortcoming that there has been proposed phenolaralkyl resin (Japanese Patent Publication 1972-15111 and Japanese Unexamined Patent Application 1992-142328) for which an aralkyl compound such as p-xylyleneglycol dimethyl ether is used in place of formaldehyde in the case of phenolic resin, with a view to improving the resin's thermal resistance and moisture resisting property. As it is, the industrial acceptance of such phenolaralkyl resin is limited to a great extent due to decline of productivity and limitation of shape such as thickness of the product, since a long heat curing time is required to achieve a given level of heat curing due to a sharp decline of the thermosetting property resulting from the addition of hexamethylenetetramine as the hardener.

Besides, attempts have been made with a view to modifying phenolaralkyl resin by way of (1) using formaldehyde in combination with an aralkyl compound for phenolaralkyl resin (Japanese Unexamined Patent Application 1992-142324) or (2) adding phenol-formaldehyde resin during or after the reaction step (Japanese Unexamined Patent Application 1992-173834; Japanese Patent Publication 1983-58378). Nevertheless, the said attempts ended in vain without being able to achieve the objective of improving thermal resistance of the resin in either instance, for the thermal resistance markedly declined to a level comparable with the conventional phenol-formaldehyde resin, even though heat curing time was shortened.

Meanwhile, British Patent 2,083,061 disclosed a method for producing phenolic resin by causing a mixture of aralkylene ether and benzaldehyde or acetal to react with phenol in the presence of catalyst at (a) a phenol-to-total aromatic compounds in ether composition molar ratio of 1.3 : 1–2.5 : 1 and (b) a $CH_2OR$-to-total CHO molar ratio of 3 : 1–10 : 1.

Nonetheless, the said method is industrially disadvantageous in that when it is cured by addition of a hardener, there is not much difference of curability compared with conventional phenolaralkyl resin, and the heat curing time is prolonged, thus lowering the productivity.

Recently, as the means to encapsulate the semiconductor there have been adopted semiconductor encapsulating materials for which such resin as epoxy resin is chosen. For such process phenol-novolak resin is adopted as hardener.

Many of today's electronic and electric component have become more compact, lighter weight and more efficient, and semiconductor device have become larger scale, high integrated and high mounting density.

But in order to increase mounting density, package size have to be smaller and thinner, and packaging configuration have been changed from pin insertion types to surface mounting types.

This change of packaging configuration requires epoxy molding compounds to have:

(1) lower thermal expansion coefficient (2) lower moisture absorption and (3) higher adhesion strength Such semiconductor encapsulating resins comprising conventional epoxy resin, however, pose problems associated with moisture resistance and thermal resistance, hence lack sufficient reliability required of the encapsulating resin, since package cracks tend to develop while in the soldering step in the resin part and the semiconductor device peels off from the resin part.

Studies to resolve said problems focused on the improvement of hardener also have been made, and in this conjunction, what is eagerly awaited is successful development of such phenolic hardener as will give a semiconductor encapsulating resin composition which will have excellent package crack resistance after solder dipping and reliability based on both low moisture absorption and high glass transition temperature.

SUMMARY OF THE INVENTION

The present invention serves to resolve the aforementioned problems. It is the object of the present invention to provide phenolic resins having excellent thermal resistance and moisture resistance with the thermosetting property inherent to the phenolic resin being preserved intact, and also to obtain a phenolic hardener capable of producing semiconductor encapsulating epoxy resin possessing excellent package crack resistance after solder dipping as well as low moisture absorption and high glass transition temperature.

The present invention relates to phenolic resins which is obtained by reacting phenols with aromatic aldehydes and xylylene compounds represented by the general formula

$ROH_2C(C_6H_4)CH_2OR$ where R is hydrogen, an alkyl group having a carbon atom number of 1–4, or an acyl group having a carbon atom number of 2–4 in the presence of acid catalyst at sum of aromatic aldehydes and xylylene compounds to phenols molar ratio of 0.1–0.95, and xylylene compounds to aromatic aldehydes molar ratio of 0.1–1.4.

DESCRIPTION OF THE PREFERRED EMBODIMENT

There can be cited as examples of the phenols of the present invention phenol, cresol, xylenol, ethylphenol, butylphenol, phenol halide, biphenols, bisphenols and naphthols, although phenol may be preferably selected.

There can be cited as examples of aromatic aldehydes benzaldehyde, methylbenzaldehyde, dimethylbenzaldehyde, t-butylbenzaldehyde, benzaldehyde halide dihydroxybenzaldehyde and naphthaldehydes, although benzaldehyde may be preferably selected.

The xylylene compounds of the present invention are represented by the general formula $$ROH_2C(C_6H_4)CH_2OR.$$

There can be cited as examples of the said xylylene compounds xylylene glycol, xylylene glycoldimethyl ether, xylylene glycoldiethyl ether, xylylene glycoldiacetoxy ester, xylylene glycoldipropioxy ester, although xylylene glycol and xylylene glycoldimethyl ether are particularly preferable.

For the acid catalyst of the present invention, such inorganic acid as phosphoric acid, sulfuric acid and hydrochloric acid or such organic acid as oxalic acid, benzene sulfonic acid, toluene sulfonic acid, methane sulfonic acid and trifluoro methane sulfonic acid may be selectively used according to the kind and use of the xylylene compound selected.

The reaction between phenols on one hand and aromatic aldehydes and xylylene compounds on the other is normally carried out for 1–10 hours at a temperature in the range of 100°–180° C.

Since this reaction proceeds with production of alcohol or carboxylic acid, whichever is produced depending on the kind of xylylene compound selected, as well as with production of water from the condensation, it is preferable that dehydration or together with dealcoholation or decarboxylation is effected at the atmospheric pressure or at reduced pressure. Nevertheless, the reaction may be carried out with reflux in the initial stage.

There may be adopted a method such that residual unreacted phenol or catalyst remaining in the reactor system may be removed by distillation under reduced pressure or washing upon completion of the condensation step, if necessary.

In the process of reacting phenols with aromatic aldehydes and xylylene compounds in the presence of acid catalyst, the reaction may be allowed to progress with both aromatic aldehydes and xylylene compounds added at the same time to phenols, or the reaction is started with either one of aromatic aldehydes and a xylylene compounds added to phenols first, and then the reaction may be continued with the other one added next.

By purging the interior of the reactor with nitrogen gas prior to the start up of the reaction, or by feeding nitrogen gas into the reactor during the reaction step, production of aromatic carboxylic acid due to oxidation of aromatic aldehydes can be prevented, and also discoloration of the produced resin can be prevented. The molar ratio of the sum of aromatic aldehydes and xylylene compounds to phenols is 0.1–0.95. Molar ratio of 0.1 or lower are not adequate, for the molecular weight of the produced resin remains low and the amount of unreacted phenols increases at such molar ratios. Molar ratio of 0.95 or higher are not preferable either, for insoluble resin tends to be produced with an increase in the molecular weight of the resin produced. Another reason why the molar ratio of 0.95 or higher is not preferable is that where the material thus obtained is used as hardener for the semiconductor encapsulating resin, the molecular weight of the produced resin ends up to be high enough to elevate the softening point, lowering the flowability of the resin in the molding step.

The ratio of xylylene compounds to aromatic aldehydes is within the range of 0.1–1.4 mole to 1 mole of aromatic aldehydes, preferably 0.2–1.2 mole. With the molar ratio remaining at 0.1 or lower, the resin cured with hexamethylenetetramine added as the hardener is hard, brittle and only gives a inferior mechanical property (Charpy-type impact strength). Where the resin is cured with epoxy resin, the material thus cured is somewhat hard and tends to be brittle. With the molar ratio set at 1.4 or higher, where the resin is cured with hexamethylenetetramine as the hardener, the resin thus obtained requires a prolonged curing time to such an extent that it provides only too poor utility for any industrial application due to the poor productivity. Also where this resin is used as hardener for epoxy resin, intended elevation of the glass transition temperature and improvement of moldability can be hardly achieved, so long as this ratio remains high. The resin having a number average molecular weight of 280–3000 obtained by the method disclosed in the present invention can be cured in a relatively short period of time when added with hexamethylenetetramine. The adequate amount of hexamethylenetetramine to be added is 5–15% by weight as against the produced resin. In this curing process, the thermosetting property can be enhanced by adding to the resin of the present invention an alkaline earth metal compound such as magnesium oxide and calcium carbonate.

Composite materials prepared by admixing fibrous reinforcing materials such as glass fiber, carbon fiber and aramid fiber and powder-form fillers such as glass powder, silica powder, graphite, PTFE powder and molybdenum disulfide which are conventionally used for the conventional phenolic resins with the phenolic resin of the present invention can be offered to an extensive range of applications as molding material or laminating material in the form of machine parts and electric-electronic parts. The same material may be also utilized as binder for friction materials such as brake lining, brake pad and clutch facing, refractory material, seal molding, and whetstone, coating and insulation varnish.

Moreover, the resin obtained according to the present invention can be cured with resol-type phenolic resin or epoxy resin, and the resin thus obtained is suitable for the electronic and microelectronic applications as semiconductor substrate and IC encapsulating material. The semiconductor encapsulating resin obtained by curing the resin composition consisting of epoxy resin, curing accelerator and inorganic filler possesses, in particular, both high moisture resistance and high glass transition temperature at the same time, has excellent moldability and excels in the package crack resistance after solder dipping, hence is quite useful as a semiconductor encapsulating resin having high reliability and high performance. As can be seen from the foregoing, the method for preparing molding compound and the applications of so-called general purpose phenolic resin are without any modification applicable to the phenolic resin obtained according to the present invention.

There is imposed no particular limitation on the epoxy resin that is intended for the use as the above-mentioned semiconductor encapsulating resin, and well known epoxy resin containing 2 or more glycidyl groups in each molecule may be used. In particular, there can be cited as examples of the resins having excellent moisture resistance, low stress property and thermal resistance biphenyl-type epoxy resin, cresol novolak-type epoxy resin, phenol-novolak-type epoxy resin, bisphenol-A-type epoxy resin, and bisphenol-F-type epoxy resin.

Even where the said resin is utilized as a hardener for the semiconductor encapsulating resin, its molecular weight is preferably 280–3000 in terms of the number average molecular weight. The phenolic hydroxyl group equivalent thereof is preferably 140–200. This hardener may be used either by itself or in combination with a well known hardener such as phenol-novolak resin, phenolaralkyl resin and tris(hydroxyphenyl)methane. The blending ratio of the phenolic hardener to epoxy resin is preferably 0.8–1.2 in terms of chemical equivalent from the viewpoint of securing excellent thermal resistance, moisture resistance and mechanical properties.

Where the phenolic resin of the present invention is used as hardener for the semiconductor encapsulating resin, it is required to remove unreacted phenols remaining in the reaction system by an adequate means such as by vacuum distillation or steam distillation upon completion of the condensation.

Furthermore, where phenolic resin is utilized as hardener, well known curing accelerators such as imidasols and organic phosphine compounds may be used. The said curing accelerators may be used either singularly or in combination of two or more kinds. The amount added is preferably 0.2–5 parts by weight per 100 parts by weight of epoxy resin from the viewpoint of securing excellent the curing property and physical properties.

For the inorganic fillers, fused silica and crystalline silica are most preferable in view of high purity and low thermal expansion coefficient. The amount of such inorganic fillers to be added is preferably 60–90% by weight of the total weight of the semiconductor encapsulating resin compounds of the present invention. Where the amount of inorganic filler added is less than 60% by weight, the resin composition thus obtained gives only insufficient package crack resistance after solder dipping, whereas the flowability of the molding compound is insufficient if the inorganic filler is added in excess of 90% by weight.

The said semiconductor encapsulating compound may be added with waxes, mold release agent, flame retardant, flame retardant auxiliary, colorant and silane coupling agent, if necessary.

EXAMPLES

The present invention will now be described in detail with reference to the following examples that by means limit the scope of the invention.

Example 1

580 parts of phenol, 230 parts of benzaldehyde, 360 of parts p-xylyleneglycoldimethyl ether and 9 parts of p-toluenesulfonic acid were introduced into a four-neck flask installed with a stirrer, a thermometer, a condenser and a nitrogen gas feed tube. The content of the flask was heated to 100°–150° C. and the reaction was carried out for 4 hours with simultaneous dehydration and demethanolation. Thereupon, the reactant was heated to 180° C., and the content of the flask was poured out into a vat to allow it to stand until it was solidified into a phenolic resin for the molding use. The obtained resin was transparent and exhibited pale yellow color and its softening point was 63° C.

Incidentally, the softening point was measured according to the following Flow Tester Method.

Flow Tester Method: 1.5 g of a specimen which had its size reduced by crushing to 80 mesh or smaller was charged into a cylindrical mold having a 1 cm$^2$ horizontal sectional area, and a plunger was inserted into the mold to render a load of 10 kgf/cm$^2$ onto the specimen. The mold temperature was then elevated from 40° C. at the rate of 6° C. per minute, and the temperature level was registered at such point in time when the plunger ceased its descent due to elimination of flake-to-flake air gap in the specimen due to the softening of the specimen.

After having added 15 parts of hexamine to 100 parts of the said resin, the obtained material was tested for its thermosetting property at 170° C. by Curastometer. The cured material was tested to determine various properties. The thermosetting property of the resin and physical properties of the cured resin were tested in accordance with the procedures described below. The test results are shown in Table 2.

Procedures (1) Curing rate as measured by Curastometer 4 grams of powder sample, obtained by admixing 100 parts of the phenolic resin and 15 parts of hexamine, was charged into Curastometer (VPS model manufactured by OrienTech) and tested to determine the maximum torque under the load of 4 kgf/cm$^2$ and at the temperature of 170° C. Measurements were also taken to determine the rate at which the torque increased when the torque was increased from 20% up to 80% of the maximum torque. The rate thus measured was termed "curing rate."

(2) Moisture absorption

Hexamine was added to phenolic resin by 13% by weight, and the mixture was cured with heating at 200° C. for 3 hours. The obtained cured resin was pulverized and an increased weight was determined when the constant weight was reached in an atmosphere of 85% relative humidity and 30° C. temperature.

(3) Temperature of 10% weight loss

The pulverized cured resin specimen described in the preceding paragraph was measured by the thermogravimetric analysis to determine the temperature level where the weight reduction had reached the level equivalent to 10% of the initial weight in the process of heating in an air stream at the temperature elevation rate of 10° C. per minute. The temperature level thus measured was termed "Temperature of 10% weight loss". The higher this value, the more excellent becomes the thermal resistance.

(4) Flexural strength (5) Flexural modulus of elasticity (6) Charpy-type impact strength 15 parts of hexamine and 100 parts of glass fiber were added to 100 parts of phenolic resin obtained by the condensation, and the mixture thus prepared was kneaded on hot rollers. This kneaded material was crushed and then compression molded in a mold maintained at 170° C. in 10 minutes. The molded material thus obtained was measured to determine its flexural strength, elastic modulus and Charpy-type impact strength in accordance with (Japanese Industrial Standard) K-6911 for each test item.

Examples 2 and 3

Resin compositions were prepared by admixing phenol, benzaldehydes and xylylene compounds in accordance with the compounding ratios shown in Table 1. Hexamine was added to the resin compositions by 13% by weight, and the resulting products were tested by Curastometer to determine curing rate according to the similar method as Example 1. Moreover, they were tested also to determine other properties in the similar procedures as EXAMPLE 1. The test results thus obtained are shown in Table 2.

Comparative Example 1

1050 parts of phenol, 680 parts of 37% formalin and 4 parts of p-toluene sulfonic acid were introduced into a four-neck flask installed with a stirrer, a thermometer, a condenser and a nitrogen gas feed tube. The content of the flask was heated to above 100° C. and the reaction was carried out for 4 hours while refluxing. And then the content of the flask was heated to 180° C. simultaneously with dehydration. The content of the flask was then poured out into a vat to allow it to stand until it was solidified. Thus was obtained novolak-type phenolic resin having a softening point of 74° C. This resin was tested to determine the curing rate by Curastometer and physical properties as cured resin in the similar procedures as EXAMPLE 1. The test results thus obtained are shown in Table 2.

Comparative Example 2

A resin was synthesized in the similar method as EXAMPLE 1 by adding to 570 parts of phenol 700 parts of p- xylyleneglycoldimethyl ether and 10 parts of p-toluenesulfonic acid. The resin product was tested to determine the curing rate by Curastometer and physical properties as cured resin in the similar procedures as EXAMPLE 1. This resin exhibited markedly slow curing rate, compared with the specimen tested in the EXAMPLES, and required a longer curing time. The test results thus obtained are shown in Table 2.

Comparative Example 3

Phenol-benzaldehyde resin was synthesized in the similar method as COMPARATIVE EXAMPLE 2 by adding to 570 parts of phenol 450 parts of benzaldehyde and 5 parts of p-toluenesulfonic acid. The resin product was tested to determine the curing rate by Curastometer and physical properties as cured resin in the similar procedures as EXAMPLE 1. Although this resin exhibited fair curing rate, the cured resin thus obtained turned out to be a resin having not only a low impact strength, but also low Temperature of 10% weight loss. The test results are shown in Table 2.

Comparative Example 4

A resin was synthesized in the similar method as EXAMPLE 1 by adding to 580 parts of phenol 159 parts of benzaldehyde, 460 parts of p-xylyleneglycol dimethyl ether and 9 parts of p-toluenesulfonic acid. The resin thus produced was tested to determine the curing rate by Curastometer and physical properties as cured resin in the similar procedures as EXAMPLE 1. This resin exhibited a curing rate slightly faster than that of the resin mentioned in COMPARATIVE EXAMPLE 2, but slower than that of the resin mentioned in EXAMPLE 1 through 3, hence is not suitable for any practical use. The test results are shown in Table 2.

TABLE 1

| Compounding ingredients | Example 1 | Example 2 | Example 3 | Comparative Example 1 | Comparative Example 2 | Comparative Example 3 | Comparative Example 4 |
| --- | --- | --- | --- | --- | --- | --- | --- |
| Parts by weight | | | | | | | |
| Phenol | 580 | 590 | 590 | 1050 | 570 | 570 | 580 |
| 37% Formalin | — | — | — | 680 | — | — | — |
| Benzaldehyde | 230 | 350 | 230 | — | — | 450 | 159 |
| p-Xylyleneglycol-dimethyl ether | 360 | 190 | — | — | 700 | — | 460 |
| p-Xylyleneglycol | — | — | 300 | — | — | — | — |
| p-Toluenesulfonic acid | 9 | 9 | 2 | 4 | 9 | 5 | 9 |

TABLE 2

| | | Example 1 | Example 2 | Example 3 | Comparative Example 1 | Comparative Example 2 | Comparative Example 3 | Comparative Example 4 |
| --- | --- | --- | --- | --- | --- | --- | --- | --- |
| Properties | | | | | | | | |
| Softening Point (°C.) | | 63 | 68 | 62 | 71 | 43 | 78 | 58 |
| Curastometer curability | Maximum torque (kg · cm) | 15.3 | 19.2 | 16.2 | 15.5 | 6.5 | 28.3 | 9.3 |
| | Curing rate (kg · cm/min) | 3.5 | 4.5 | 3.7 | 4.9 | 0.5 | 6.8 | 1.8 |
| Moisture absorption (wt %) | | 2.1 | 2.2 | 2.2 | 4.6 | 2.2 | 2.1 | 2.0 |
| Temperature of 10% weight loss (°C.) | | 426 | 425 | 428 | 375 | 430 | 410 | 428 |

TABLE 2-continued

|  | Example 1 | Example 2 | Example 3 | Comparative Example 1 | Comparative Example 2 | Comparative Example 3 | Comparative Example 4 |
|---|---|---|---|---|---|---|---|
| Flexural strength (kgf/mm$^2$) | 16.8 | 18.3 | 16.2 | 17.5 | 14.4 | 16.5 | 14.7 |
| Flexural modulus of elasticity (kgf/mm$^2$) | 1620 | 1720 | 1630 | 1550 | 1250 | 1800 | 1350 |
| Charpy-type impact strength (kgfcm/cm$^2$) | 5.8 | 4.6 | 5.6 | 5.1 | 4.5 | 2.5 | 4.7 |

As can be clearly seen from the test results shown in Table 2, the phenolic resins obtained according to the method disclosed by the present invention as per EXAMPLES 1 through 3 exhibit their moisture absorptions one-half as less than that of the conventional phenolic resin (COMPARATIVE EXAMPLE 1). Their Temperature of 10% weight loss is in every instance higher than 400° C., which is higher than that of phenol-formaldehyde resin shown in COMPARATIVE EXAMPLE 1 by 30°–50° C. These phenolic resins exhibit by far faster curing rates than that of phenol aralkyl resin indicated in COMPARATIVE EXAMPLE 2 and 3, and can be cured at curing rate comparable with that of conventional phenolic resin. They are indeed excellent molding materials and laminating materials in that their impact strength is higher than that of phenol-benzaldehyde resin of EXAMPLE 3.

Example 4

634 parts by weight of phenol, 143 parts by weight of benzaldehyde, 224 parts by weight of p-xylyleneglycoldimethyl ether and 0.05 parts by weight of trifluoromethane sulfonic acid were introduced into a four-neck flask installed with a stirrer, a thermometer, a condenser and a nitrogen gas feed tube. The content of the flask was heated to 130°–140° C. and the condensation reaction was proceeded with simultaneous dehydration and demethanolation until these by-products of condensation was no longer recognized. Thereupon, by removing unreacted phenol and catalyst remaining in the reaction system by distillation under reduced pressure, phenolic resin for curing epoxy resin(A) was obtained. The product(A) thus obtained exhibited a softening point of 64° C. and a phenolic hydroxyl group equivalent of 165 g/eq.

Semiconductor encapsulating compound was obtained by first admixing the epoxy resin shown in Table 3 and the other components with the phenolic resin, obtained according to the above-mentioned procedure, at a blending ratio shown in Table 4; thoroughly pre-mixing the said compounding ingredients; kneading the mixture on mixing rollers; cooling and solidifying the kneaded material; and by finally by crushing the solidified material. The encapsulating compound specimens were tested to determine various properties. The test results are shown in Table 4.

Physical properties of the above-mentioned encapsulating material was measured in accordance with the following Procedures.

(1) Spiral flow (flow property)

The encapsulating material was tested to determine the flow distance by subjecting it to a 70 kgf/cm$^2$ load in a transfer mold maintained at 175° C.

(2) Molding curability

The encapsulating material was tested to determine the molding curability by measuring the hardness of the cured molding part obtained by transfer molding the specimen at 175° C. in a 120 seconds cycle upon lapse of 10 seconds after it was released from the mold. Molding curability is shown according to the following 4 ranks:

⊚: Excellent

○: Good

△: Moderate x : Poor (3) Moisture absorption ratio

After having encapsulated the test-use semiconductor device (6.7 mm×6.7 mm) by low-pressure transfer molding at 175° C. in a 150 seconds cycle, the molded specimen was subjected to the after-cure step at 150° C. for 2 hours followed by 180° C. for 6 hours. The moisture absorption ratio of this test-use device was measured as to the change in weight which occurred after it had been held at 80° C. and 90% humidity for 96 hours.

(4) Glass transition temperature

A cured article of 5×5×2 mm size was prepared by forming and curing the molding material under the molding conditions of 175° C. and a 150 seconds-cycle and the after-cure conditions of 150° C. for 2 hours followed by 180° C. for 6 hours. The obtained specimen was tested to determine its glass transition temperature by the TMA method.

(5) Package crack resistance after solder dipping 20 pieces of the test-use semiconductor device, immediately after they had been referred to measurement of the moisture absorption were tested to determine the package crack failure ratio after 10 seconds immersion in the solder bath maintained at 260° C.

Example 5

728 parts by weight of o-cresol, 143 parts by weight of benzaldehyde, 224 parts by weight of p-xylyleneglycoldimethyl ether and 2 parts by weight of p-toluenesulfonic acid (1 hydrate) were introduced into the same type of the apparatus as EXAMPLE 4, and the reaction was carried out in the similar method as EXAMPLE 4 until by-product of condensation was no longer recognized. The reaction product was dissolved in methyl isobutyl ketone, and the solution was rinsed with water through a separating funnel. Then, by removing the solvent and unreacted o-cresol from the organic phase by distillation under reduced pressure, the product(B) was obtained. The obtained product (B) exhibited a softening point of 62° C. and a phenolic hydroxyl group equivalent of 178 g/eq.

The epoxy resin and the other compounding ingredients were blended with the said phenolic resin at the blending ratio indicated in Table 4. Thus was obtained a semiconductor encapsulating compounds in the similar procedures as EXAMPLE 4, which was tested to determine physical properties. The test results are shown in Table 4.

Example 6

640 parts by weight of 1-naphthol, 160 parts by weight of p-xylyleneglycol, 120 parts by weight of benzaldehyde and 0.01 part by weight of trifluoromethane sulfonic acid were poured into the same type of the apparatus as EXAMPLE 4, and with heating to 130°–140° C., the reaction was carried out with dehydration until condensate water was no longer recognized. And, by removing unreacted 1-naphthol and catalyst by steam distillation under reduced pressure, the product(C) was obtained. The obtained product(C) exhibited a softening point of 77° C. and a hydroxyl group equivalent of 196 g/eq. The epoxy resin and the other compounding ingredients shown in Table 4 were blended with the said phenolic resin added as hardener at the blending ratio indicated in Table 4. Thus was obtained a semiconductor encapsulating resin molding material in the similar procedures as EXAMPLE 4, which was tested to determine physical properties. The test results are shown in Table 4.

Example 7

605 parts by weight of phenol, 204 parts by weight of 2-naphthaldehyde, 210 parts by weight of p-xylyleneglycol dimethyl ether, and 2 parts by weight of p-toluenesulfonic acid (1 hydrate) were introduced into the same type of the apparatus as EXAMPLE 4, and with heating to 130°–140° C., the reaction was carried out with simultaneous dehydration and demethanolation until by-products of condensation were no longer recognized. The reaction product was dissolved in dichloromethane, and the solution was rinsed with water through a separating funnel. Then, by removing the solvent and unreacted phenol from the organic phase by distillation under reduced pressure, the product(D) was obtained. The product(D) exhibited a softening point of 66° C. and aphenolic hydroxyl group equivalent of 182 g/eq.

The epoxy resin and the other compounding ingredients were blended with the said phenolic resin added as hardener at the blending ratio indicated in Table 4. Thus was obtained a semiconductor encapsulating compound in the similar procedures as EXAMPLE 4, which was tested to determine physical properties. The test results are shown in Table 4.

Comparative Examples 5 and 6

The epoxy resin and the other compounding ingredients were blended with phenolaralkyl resin (softening point of 52° C. and phenolic hydroxyl group equivalent of 172 g/eq) and phenol-novolak resin (softening point of 65° C. and a phenolic hydroxyl group equivalent of 106 g/eq) being used singularly as the phenolic hardener by the blending ratios shown in Table 4 in the similar procedures as EXAMPLES 4 through 7 to produce semiconductor encapsulating compounds. The obtained encapsulating compounds specimens were tested to determine physical properties in the similar procedures as EXAMPLES 4 through 7. The test results are shown in Table 4.

TABLE 3

| Epoxy resin | 4,4'-bis(2,3epoxypropoxy)-3,3',5,5'-tetramethylbiphenyl (epoxy equivalent 186) |
|---|---|
| Phenolic hardener | |
| A | Condensation product from phenol, benzaldehyde and p-xylyleneglycol-dimethyl ether (hydroxyl group equivalent 165) |
| B | Condensation product from o-cresol, benzaldehyde and p-xyleleneglycol-dimethyl ether (hydroxyl group equivalent 178) |
| C | Condensation product from 1-naphthol, benzaldehyde and p-xylyleneglycol (hydroxyl group equivalent 196) |
| D | Condensation product from phenol, 2-naphthoaldehyde and p-xylyleneglycol-dimethyl ether (hydroxyl group equivalent 182) |
| E | Phenolaralkyl resin "XL-225-LLL" made by Mitsui Toatsu Chemicals, Inc. (hydroxyl group equivalent 172) |
| F | Phenol-novolak resin "TD 2131" made by Dainippon Ink and Chemicals, Inc. (hydroxyl group equivalent 106) |

TABLE 4

| | Examples | | | | Comparative Examples | |
|---|---|---|---|---|---|---|
| | 4 | 5 | 6 | 7 | 5 | 6 |
| Components & Blending ratio | | | | | | |
| Epoxy resin | 132 | 128 | 122 | 126 | 130 | 159 |
| Phenolic hardener | | | | | | |
| A | 118 | | | | | |
| B | | 122 | | | | |
| C | | | 128 | | | |
| D | | | | 124 | | |
| E | | | | | 120 | |
| F | | | | | | 91 |
| Fused silica powder | 750 | → | → | → | → | → |
| Triphenylphosphine | 2 | → | → | → | → | → |
| Brominated epoxy resin | 15 | → | → | → | → | → |
| Antimony trioxide | 2 | → | → | → | → | → |
| Carnauba wax | 3 | → | → | → | → | → |
| Silane coupling agent | 5 | → | → | → | → | → |
| Carbon black | 3 | → | → | → | → | → |

TABLE 4-continued

|  | Examples | | | | Comparative Examples | |
|---|---|---|---|---|---|---|
|  | 4 | 5 | 6 | 7 | 5 | 6 |
| Properties | | | | | | |
| Spiral flow (cm) | 101 | 110 | 86 | 90 | 82 | 83 |
| Molding curability | O | O | O | O | Δ–X  | O– |
| Moisture absorption (wt %) | 0.23 | 0.23 | 0.19 | 0.21 | 0.24 | 0.44 |
| Glass transition temperature (°C.) | 133 | 135 | 152 | 140 | 107 | 150 |
| Package crack development ratio after solder dipping (Number of specimens with cracks/Number of specimens) | 0/20 | 0/20 | 0/20 | 0/20 | 2/20 | 20/20 |

As is clearly seen from the test results shown forth in Table 4, all of the specimens cited in the EXAMPLES of the present invention, in which products by condensation of phenol/aromatic aldehyde/p-xylyleneglycol dimethyl ether were used as the hardener, exhibit low moisture absorption and high glass transition temperature. Those specimens also did not develop package crack after solder dipping.

On the other hand, in COMPARATIVE EXAMPLE 5 in which only phenolaralkyl resin was used as hardener, the specimen exhibited a low glass transition temperature, although its moisture absorption was low. Its package crack resistance after solder dipping was inferior to any of the specimens cited in the EXAMPLES. In COMPARATIVE EXAMPLE 6 in which only conventional phenol-novolak resin was used as the hardener, the specimen exhibited a high moisture absorption and developed many package cracks when dipped in solder bath, although its glass transition temperature was high.

EFFECT OF THE INVENTION

According to the present invention, there can be obtained phenolic resins having excellent thermal resistance and moisture absorption and thermosetting property. The obtained resin can be offered to an extensive range of uses as molding material, laminating material and various kinds of binder in the form of machine parts and electric- electronic parts. Epoxy resin compositions for which this resin is utilized as hardener possess an excellent combination of high moisture resistance, high thermal resistance (high glass transition temperature) and low package crack failure after solder dipping, and their industrial value as an encapsulating material useful for electronic and microelectronic circuitry part is quite substantial by virtue of their excellent package crack resistance after solder dipping and high reliability when utilized as the encapsulating material for the semiconductor devices.

We claim:

1. A phenolic resin which is obtained by reacting a phenol with an aromatic aldehyde and a xylylene compound represented by the formula $$ROH_2C(C_6H_4)CH_2OR$$

where R is hydrogen, an alkyl group having a carbon atom number of 1–4, or an acyl group having a carbon atom number of 2–4 in the presence of an acid catalyst, with the sum of aromatic aldehyde and xylylene compound to phenol molar ratio being 0.1–0.95, and the xylylene compound to aromatic aldehyde molar ratio being 0.1–1.4.

2. The phenolic resin according to claim 1 wherein said phenol is phenol.

3. The phenolic resin according to claim 1 wherein said aromatic aldehyde is benzaldehyde.

4. The phenolic resin according to claim 1 wherein the xylylene compound is selected from the group consisting of xylylene glycol and xylylene glycol dimethyl ether.

5. A method for producing a cured product of phenolic resin wherein the phenolic resin described in claim 1 is cured with hexamethylenetetramine added thereto.

6. A hardener for an epoxy resin comprising a phenolic resin according to claim 1.

7. A resin composition comprising a phenolic resin according to claim 1, an epoxy resin, a curing accelerator and an inorganic filler.

8. A method for producing a phenolic resin which comprises reacting a phenol with an aromatic aldehyde and a xylylene compound represented by the formula $$ROH_2C(C_6H_4)CH_2OR$$

where R is hydrogen, an alkyl group having a carbon atom number of 1–4, or an acyl group having a carbon atom number of 2–4 in the presence of acid catalyst, with the sum of aromatic aldehyde and xylylene compound to a phenol molar ratio being 0.1–0.95, and the xylylene compound to aromatic aldehyde molar ratio being 0.1–1.4.

* * * * *